(12) United States Patent
Dunham et al.

(10) Patent No.: US 10,464,493 B2
(45) Date of Patent: Nov. 5, 2019

(54) DEPLOYABLE DOOR PANEL RECEPTACLE FOR VEHICLES

(71) Applicant: Ford Global Technologies, LLC, Dearborn, MI (US)

(72) Inventors: Scott Holmes Dunham, Redford, MI (US); Bhavani Thota, Novi, MI (US); Stephen Dreher, Brownstown, MI (US); Linh Doan, Belleville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 7 days.

(21) Appl. No.: 15/702,942

(22) Filed: Sep. 13, 2017

(65) Prior Publication Data

US 2019/0077324 A1 Mar. 14, 2019

(51) Int. Cl.
*B60R 7/04* (2006.01)
*B60N 2/75* (2018.01)
*B60R 13/02* (2006.01)

(52) U.S. Cl.
CPC .............. *B60R 7/046* (2013.01); *B60N 2/78* (2018.02); *B60R 13/0243* (2013.01)

(58) Field of Classification Search
CPC ........ B60N 2/793; B60N 2/753; B60N 2/773; B60N 2/78; B60N 2/4235; B60R 7/04; B60R 13/0243; B60R 2013/0287; A47C 7/70
USPC ...................................................... 296/37.13
See application file for complete search history.

(56) References Cited

U.S. PATENT DOCUMENTS

| | | | | |
|---|---|---|---|---|
| 5,037,687 A | * | 8/1991 | Kargarzadeh | B29C 33/02 428/158 |
| 5,125,815 A | * | 6/1992 | Kargarzadeh | B29C 33/02 249/78 |
| 5,173,228 A | * | 12/1992 | Kargarzadeh | B29C 33/02 249/78 |
| 5,230,855 A | * | 7/1993 | Kargarzadeh | B29C 33/02 249/160 |
| 5,482,344 A | * | 1/1996 | Walker | B60R 21/0428 280/751 |
| 5,529,370 A | * | 6/1996 | Veit | B60J 5/042 296/146.7 |
| 5,845,888 A | * | 12/1998 | Anderson | B60N 3/102 248/311.2 |
| 5,868,455 A | * | 2/1999 | Springer | B29C 65/04 296/146.1 |
| 6,073,984 A | | 6/2000 | Chaloult et al. | |
| 6,092,858 A | * | 7/2000 | Bolwell | B29C 51/16 156/212 |
| 6,149,224 A | * | 11/2000 | Tiberia | B60R 13/0243 280/751 |

(Continued)

FOREIGN PATENT DOCUMENTS

CN 202896440 U 4/2013
DE 102013001496 A1 7/2014

*Primary Examiner* — Kiran B Patel
(74) *Attorney, Agent, or Firm* — Vichit Chea; Brooks Kushman, P.C.

(57) ABSTRACT

A vehicle door assembly may include an interior door panel having an armrest, the armrest having a handle defining an opening therein and a receptacle arranged below the armrest and configured to be selectively arranged under the handle to create a repository within the opening to receive objects.

6 Claims, 8 Drawing Sheets

(56) References Cited

U.S. PATENT DOCUMENTS

| | | | | |
|---|---|---|---|---|
| 6,726,872 | B1* | 4/2004 | Morrison | B29C 45/14196 |
| | | | | 264/161 |
| 6,986,543 | B2* | 1/2006 | Reed | B60R 21/04 |
| | | | | 296/153 |
| 7,032,954 | B2* | 4/2006 | Radu | B60N 3/083 |
| | | | | 296/146.7 |
| 7,077,456 | B2* | 7/2006 | Bailey | B60R 13/0243 |
| | | | | 296/153 |
| 7,222,910 | B1* | 5/2007 | Doan | B60N 2/4235 |
| | | | | 296/153 |
| 7,458,631 | B2* | 12/2008 | Cowelchuk | B60N 2/78 |
| | | | | 296/153 |
| 7,789,455 | B2* | 9/2010 | Hall | B60J 5/0468 |
| | | | | 296/1.09 |
| 8,444,209 | B2* | 5/2013 | Kato | B60R 21/0428 |
| | | | | 296/146.7 |
| 8,469,428 | B1* | 6/2013 | Tobey | B60R 13/0243 |
| | | | | 296/1.02 |
| 8,505,997 | B2* | 8/2013 | Hipshier | B60N 3/101 |
| | | | | 296/37.8 |
| 8,585,122 | B2* | 11/2013 | Iwasaki | B60R 13/0243 |
| | | | | 296/146.7 |
| 8,979,171 | B2* | 3/2015 | Usami | B60R 13/0243 |
| | | | | 296/153 |
| 2006/0103149 | A1* | 5/2006 | Barlow, Jr. | E05B 85/08 |
| | | | | 292/336.3 |
| 2008/0219017 | A1* | 9/2008 | Cruickshank | B60Q 3/85 |
| | | | | 362/488 |
| 2008/0237925 | A1* | 10/2008 | VonHoltz | B29C 45/14196 |
| | | | | 264/275 |
| 2009/0066107 | A1* | 3/2009 | Sakamoto | B60R 13/0243 |
| | | | | 296/39.1 |
| 2009/0079228 | A1* | 3/2009 | Sturt | B60N 2/78 |
| | | | | 296/153 |
| 2009/0121515 | A1* | 5/2009 | Shiono | B60N 3/026 |
| | | | | 296/146.6 |
| 2009/0127738 | A1* | 5/2009 | Smith | B29C 45/1639 |
| | | | | 264/254 |
| 2009/0134659 | A1* | 5/2009 | Hall | B60J 5/0434 |
| | | | | 296/146.7 |
| 2009/0206630 | A1* | 8/2009 | Cavallin | B60J 5/042 |
| | | | | 296/146.7 |
| 2011/0304172 | A1* | 12/2011 | Cho | B60N 3/02 |
| | | | | 296/146.7 |
| 2012/0299324 | A1* | 11/2012 | Langenbacher | B60N 3/101 |
| | | | | 296/37.13 |
| 2013/0055643 | A1* | 3/2013 | Setina | B60J 11/06 |
| | | | | 49/463 |
| 2014/0138978 | A1* | 5/2014 | Langenbacher | B60N 3/101 |
| | | | | 296/37.13 |
| 2015/0144469 | A1* | 5/2015 | Martinez Vite | H01H 9/02 |
| | | | | 200/304 |
| 2015/0158402 | A1* | 6/2015 | Faruque | B60N 2/783 |
| | | | | 297/411.22 |
| 2015/0231999 | A1* | 8/2015 | Jadhav | B60N 2/78 |
| | | | | 296/153 |
| 2016/0016494 | A1* | 1/2016 | Farooq | B60N 2/767 |
| | | | | 297/411.21 |
| 2016/0121768 | A1* | 5/2016 | Terranova | B60N 3/103 |
| | | | | 297/188.14 |
| 2017/0057330 | A1* | 3/2017 | Hamdoon | B60J 5/0456 |
| 2017/0313229 | A1* | 11/2017 | Isernio | B60N 3/007 |
| 2018/0022247 | A1* | 1/2018 | Attala | B60N 2/763 |
| | | | | 297/188.17 |
| 2018/0111578 | A1* | 4/2018 | Bozio | B60N 2/75 |
| 2018/0154743 | A1* | 6/2018 | Rao | B60R 13/0243 |
| 2018/0186306 | A1* | 7/2018 | Fitzpatrick | B60R 13/0243 |

* cited by examiner

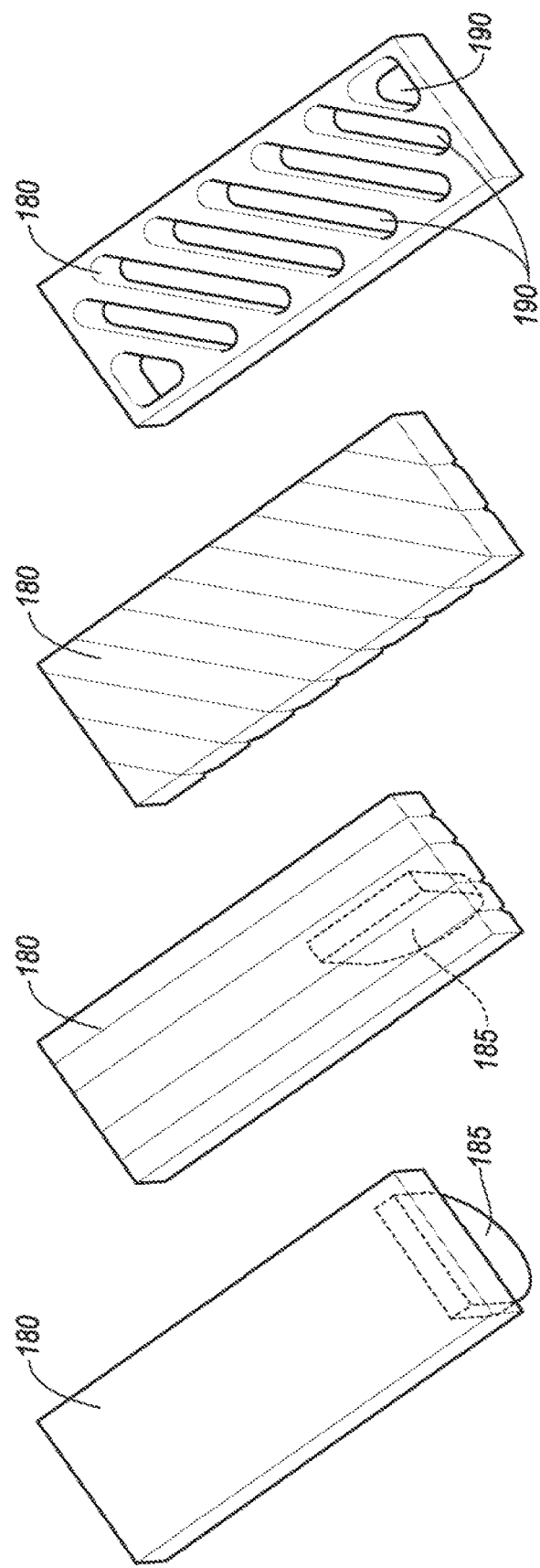

DEPLOYABLE DOOR PANEL RECEPTACLE FOR VEHICLES

TECHNICAL FIELD

Disclosed herein are deployable door panel receptacles for vehicles.

BACKGROUND

Vehicles often include various storage receptacles within the interior cabin. These storage receptacles may include various compartments for holding beverage containers, keys, mobile devices, etc.

SUMMARY

A vehicle door assembly may include an interior door panel having an armrest, the armrest having a handle defining an opening therein and a receptacle arranged below the armrest and configured to be selectively arranged under the handle to create a repository within the opening to receive objects.

An interior door panel of a vehicle may include an armrest having a handle defining an opening therein, a pair of parallel tracks arranged at an underside of the armrest, and a receptacle arranged below the armrest and configured to be arranged and slidable along the track between stored and deployed positions, wherein in the deployed position the receptacle is arranged under the handle to create a repository within the opening to receive objects.

A vehicle door assembly may include an interior door panel having an armrest, the armrest having a handle defining an opening therein and a base plate arranged below the armrest and configured to be selectively arranged under the handle to create a repository within the opening to receive objects.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 6A illustrates an example plate having a solid flat surface;

FIG. 6B illustrates an example plate having a tambour design extending lengthwise;

FIG. 6C illustrates an example plate having a diagonal tambour design;

FIG. 6D illustrates an example plate defining a plurality of slots;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles often include various storage receptacles within the interior cabin. These storage receptacles may include various compartments for holding beverage containers, keys, mobile devices, etc. However, customers often complain about a lack of storage for cellular phones, mobile devices, and other small items such as lip balm, loose change, etc. Often times customers carry multiple mobile devices including a cellular phone for each personal and professional use.

Disclosed herein is a deployable receptacle arranged within an interior of a vehicle door under an arm rest grab handle. The receptacle may be slidable under the opening created by the handle to close the opening and create a pocket within the handle. By allowing the receptacle to be slidable, the customer may elect to create a pocket within the handle, creating a customizable interior handle that may also function as a storage receptacle. In one example, the receptacle may include a container or bin arranged within a pair of tracks that slides from a stored position to a deployed position. In another example, the receptacle may include a flat panel that slides along the tracks.

Figure 1:
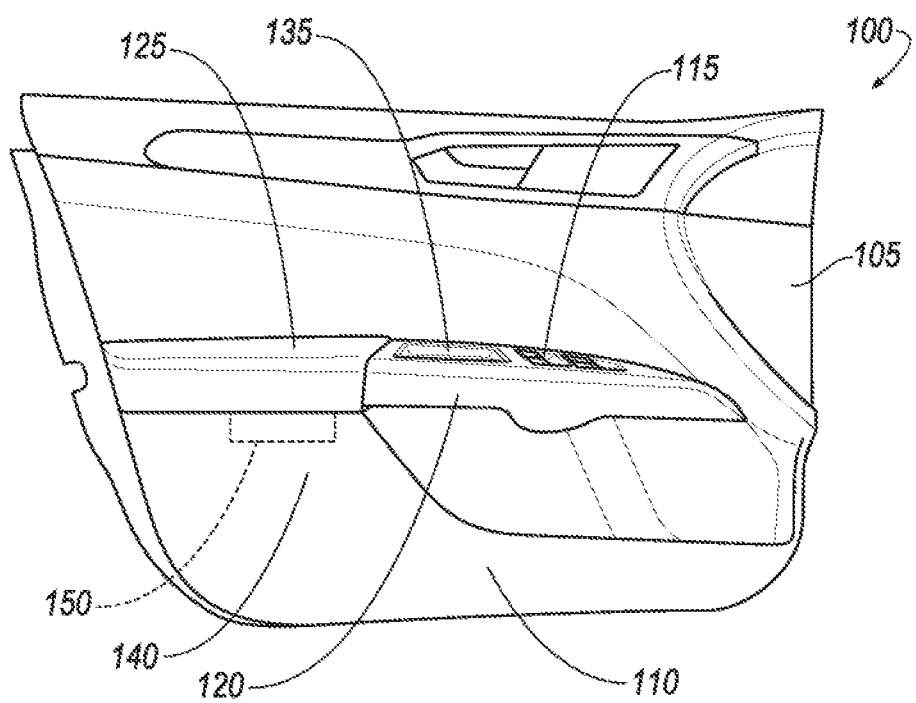
FIG. 1 illustrates an interior view of an example door assembly with a receptacle in a stored position.

FIG. 1 illustrates an interior view of an example door assembly 100. The door assembly 100 may include an interior panel 105. The interior panel 105 may be accessible from the inside of the vehicle and may include various handles, buttons, and pockets. For example, the interior panel 105 may define a map pocket 110 at a bottom of the panel for receiving various items such as maps, notebooks, beverage containers, etc. The interior panel 105 may also include window controls and door lock buttons 115. The interior panel 105 may include a handle 120 defined within an armrest 125. The handle 120 and armrest 125 may be arranged approximately in the middle of the interior panel 105. The armrest 125 may be provided for the comfort of the driver. The handle 120 may be provided to allow the driver to close the door once seated within the vehicle.

The handle 120 may define an opening 135 so that a driver's hand may easily grip the handle. The interior panel 105 may define a cavity 140 arranged under the armrest 125. The cavity 140 may be configured to house a receptacle 150. The receptacle 150, which is shown in phantom in FIG. 1, may be configured to be storable within the cavity 140. The receptacle 150 may be slidable into a deployed position, as shown in FIG. 2.

Figure 2:
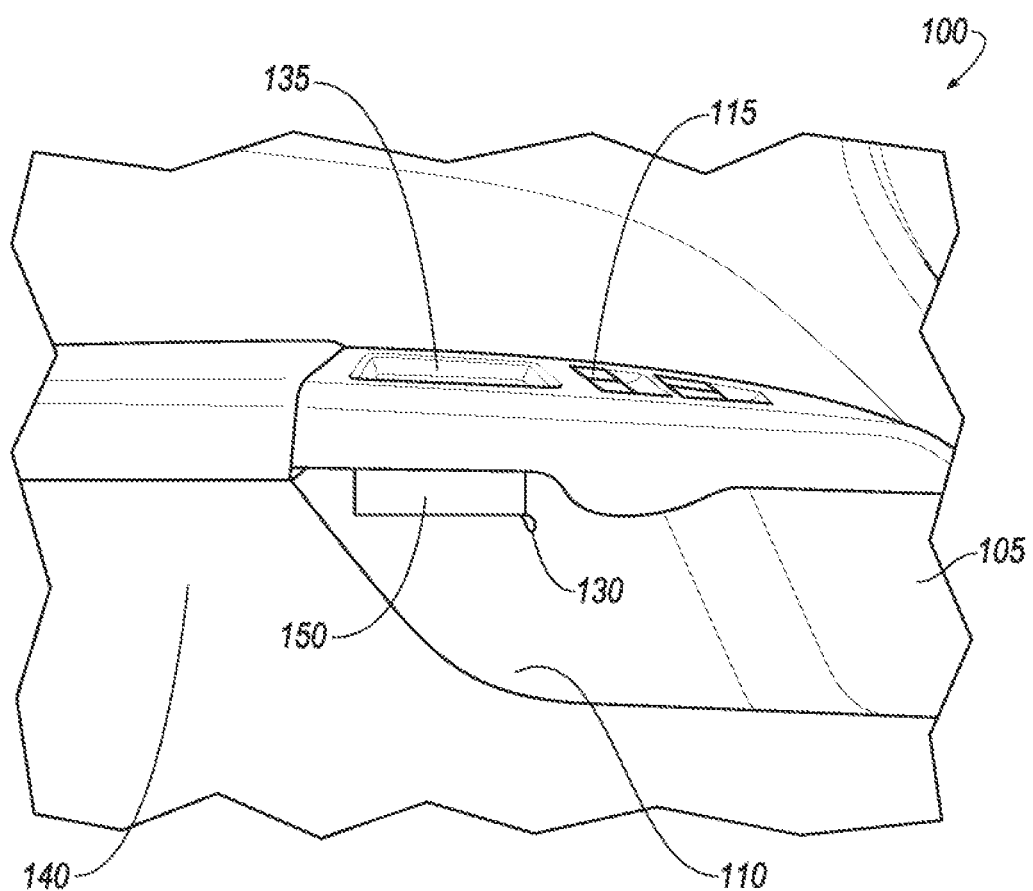
FIG. 2 illustrates an interior view of an example door assembly with a receptacle in a deployed position.

The receptacle 150 may generally form a cube-like shape or a rectangular prism-like shape, as shown by way of example in FIGS. 1 and 2. The receptacle 150 may function as a bin configured to hold items. The receptacle 150 may include a tab 130 configured to engage with a driver's finger. The tab 130 may allow the driver to easily push and pull the receptacle 150 between the stored and deployed positions.

Referring to FIG. 2, the receptacle 150 may be configured to slide from the stored position to a deployed position. In the deployed position, the receptacle 150 may be arranged under the opening 135 defined by the handle 120. The receptacle 150 may thus create a closed storage repository under the handle 120.

Figure 3C:
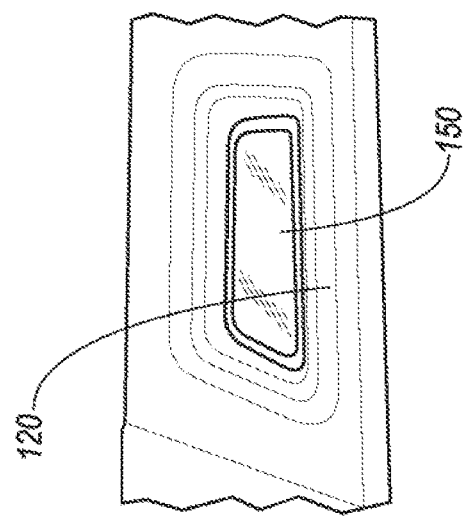
FIG. 3C illustrates a top view of a handle of the door assembly of FIG. 1 with a receptacle arranged in a deployed position.
Figure 3B:
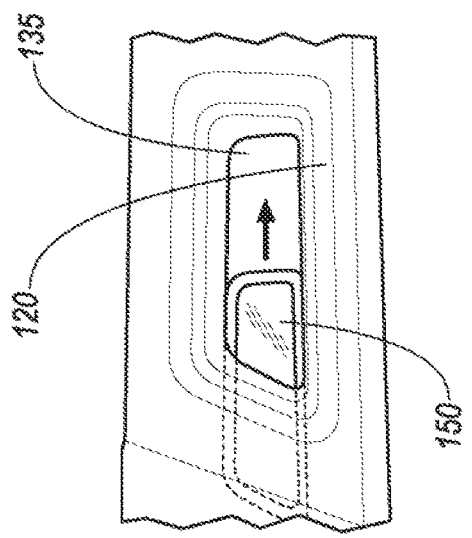
FIG. 3B illustrates a top view of a handle of the door assembly of FIG. 1 with a receptacle arranged in a partially deployed position.
Figure 3A:
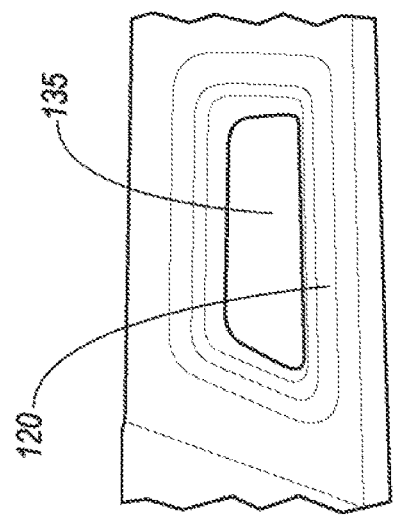
FIG. 3A illustrates a top view of a handle of the door assembly of FIG. 1 with a receptacle arranged in a stored position.

FIGS. 3A-3B illustrate top views of the handle 120 and receptacle 150. FIG. 3A illustrates a top view of the handle 120 with the receptacle 150 arranged in the stored position. In the stored position, the receptacle 150 may be arranged within the cavity 140 allowing the handle 120 to be completely open to the space below the armrest 125. That is, an object may pass through the handle 120 and no items may be stored within the opening 135.

FIG. 3B illustrates a top view of the handle 120 with the receptacle 150 in a partially deployed position. As explained above, the receptacle 150 may slide from a stored position within the cavity.

FIG. 3C illustrates a top view of the handle 120 with the receptacle 150 in a deployed position. In the deployed position, the receptacle 150 may 'close' the opening and create a bottom to the opening, allowing object to be stored within the created storage repository.

As explained above, the receptacle 150 may form a rectangular prism-like shape. The receptacle 150 may mimic the two-dimensional shape of the opening 135 created by the handle 120. As shown in FIGS. 3A-C, the opening 135 is not a perfect rectangle, but rather a generally trapezoidal shape may be formed. The receptacle 150 may mimic this shape in order to create a better fit under the handle 120.

Figure 4:
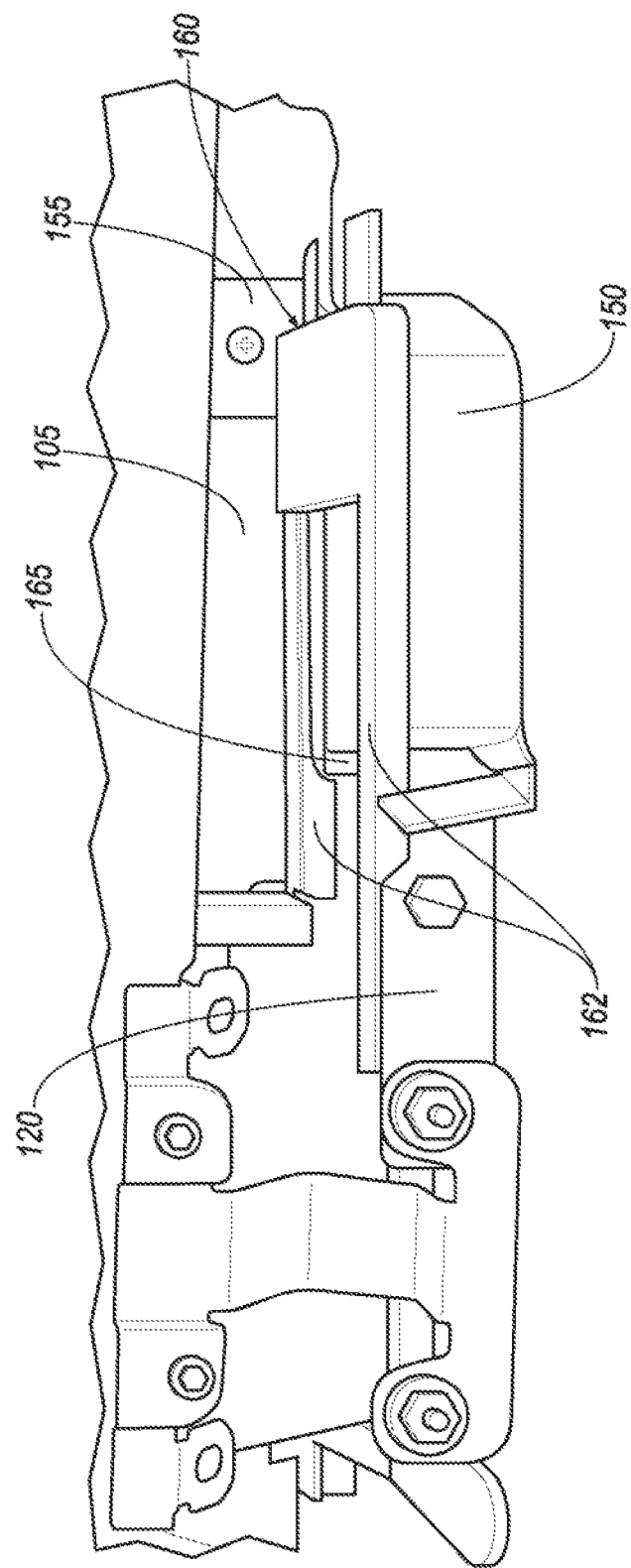
FIG. 4 illustrates a perspective rear view of an interior of a portion of the door assembly.

FIG. 4 illustrates a perspective rear view of an interior of a portion of the door assembly 100. The door assembly 100 may include a track assembly 160 having a pair of parallel tracks 162 for maintaining a lip 165 of the receptacle therein. The lip 165 may be slidable within the tracks 162, allowing the receptacle 150 to move from a stored position within the cavity 140 (as shown in FIG. 5) to the deployed position under the handle 120.

The track assembly 160 may be attached to the interior panel 105 via an attachment mechanism 155. The attachment mechanism 155 may be metal plate attached to the track assembly 160 and the interior panel 105 via a screw or bolt. Other attachment mechanisms may be included such as adhesives including glue, soldering, snaps, hooks, welding, etc.

Figure 5A:
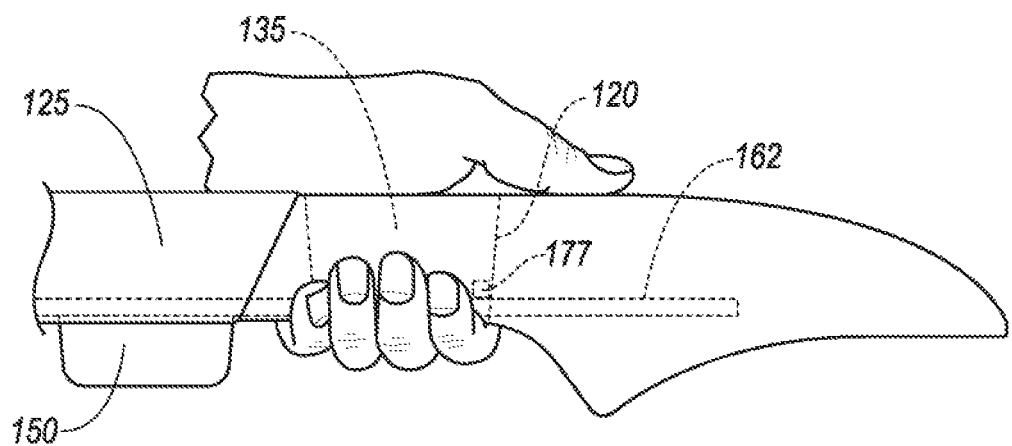
FIG. 5A illustrates an example cross-sectional view of the handle and the receptacle in the stored position.
Figure 5B:
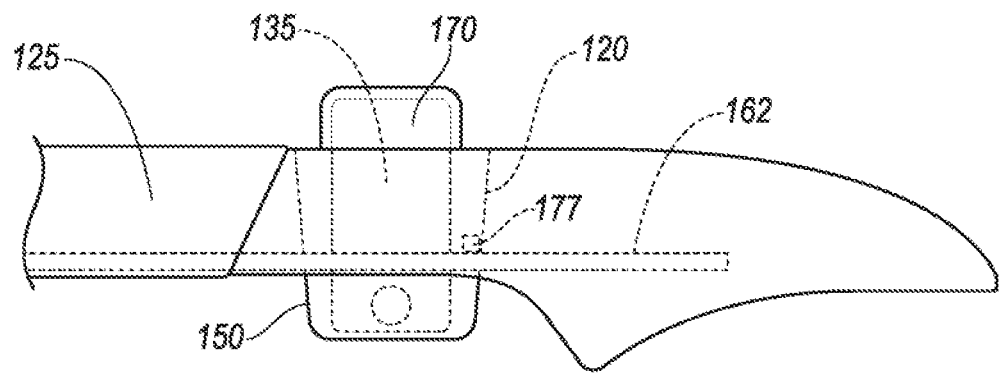
FIG. 5B illustrates an example cross-sectional view of the handle and the receptacle in the deployed position.

FIGS. 5A and 5B illustrate example cross-sectional views of a portion of the door assembly 100. FIG. 5A illustrates an example cross-sectional view of the handle 120 and the receptacle 150 in the stored position. As explained above with respect to FIG. 4, the door assembly 100 may include a pair of tracks 162 whereby the receptacle 150 is slidable therein. In FIG. 5A, the receptacle 150 is in the stored position, allowing the opening 135 to be completely passable and thus allowing a driver's hand to extend through the opening and around the handle 120.

A push-pin 177 may be arranged on at least one of the tracks 162. The push-pin 177 may have a natural relaxed state in which the push-pin is extended into the track, thus obstructing the track. The push-pin, in the relaxed state, may prevent objects such as the receptacle 150 from sliding along the tack 162. The push-pin may be depressed by the driver when the driver wishes to move the receptacle 150 along the track 162. The push-pin 177 may be spring loaded such that after depression, the push-pin 177 may resume its normal relaxed state. The push-pin 177 may maintain the receptacle in a fixed location along the track 162 but abutting the lip 165 of the receptacle and preventing laterally movement thereof.

FIG. 5B illustrates an example cross-sectional view of the handle 120 and the receptacle 150 in the deployed position. In the deployed position, the receptacle 150 is arranged under the opening 135, thus closing the opening at the bottom and created a storage vessel or repository. The repository may create a compartment large enough to house at least a portion of a mobile device 170, as shown by way of example in FIG. 5B.

FIGS. 6A-D illustrate example base plates 180 to be included in the door assembly as a receptacle 150. The plates 180 may be configured to slide within the tracks 162 and to close the bottom of the opening 135 when the plate 180 is in the deployed position. Unlike the examples of the receptacle 150 shown in FIGS. 1-5, the plates 180 may be flat and non-bin-like. These plates 180 may sufficiently serve to 'close' the opening 135 within the handle, but take up less space within the cavity 140 than would the receptacle 150.

FIG. 6A illustrates an example plate 180 having a solid flat surface and a tab 185, similar to the tab 130 described above with respect to FIGS. 1 and 2. In the deployed position, the plate 180 may close the bottom of the opening 135 within the handle 120 to great a repository in which to store objects such as a mobile device. The repository created by the deployed plate 180 may have a depth less than a repository created by the receptacle 150 of FIGS. 1 and 2.

FIG. 6B illustrates an example plate 180 having a tambour design extending lengthwise along the plate 180. The tambour design may allow for grooves run lengthwise. The tambour design may allow for the plate 180 to be compressible. That is, upon impact, the plate 180 may compress, bend, crumble, in order to avoid contact or impact at the driver.

In the example of FIG. 6B, the tab 130 may extend parallel with the length of the plate 180, unlike the example of FIG. 6A where the tab 130 extends parallel with the width of the plate 180.

FIG. 6C illustrates an example plate 180 having a diagonal tambour design. Similar to the example of FIG. 6B, FIG. 6D illustrates an example plate 180 where the plate 180 defines a plurality of slots 190. The slots 190 may permit air to pass through the plate 180, while still maintaining enough rigidity and covering enough surface area to maintain an object thereon when in the deployed position. The slots may further allow the plate 180 to be compressible.

Figure 7:
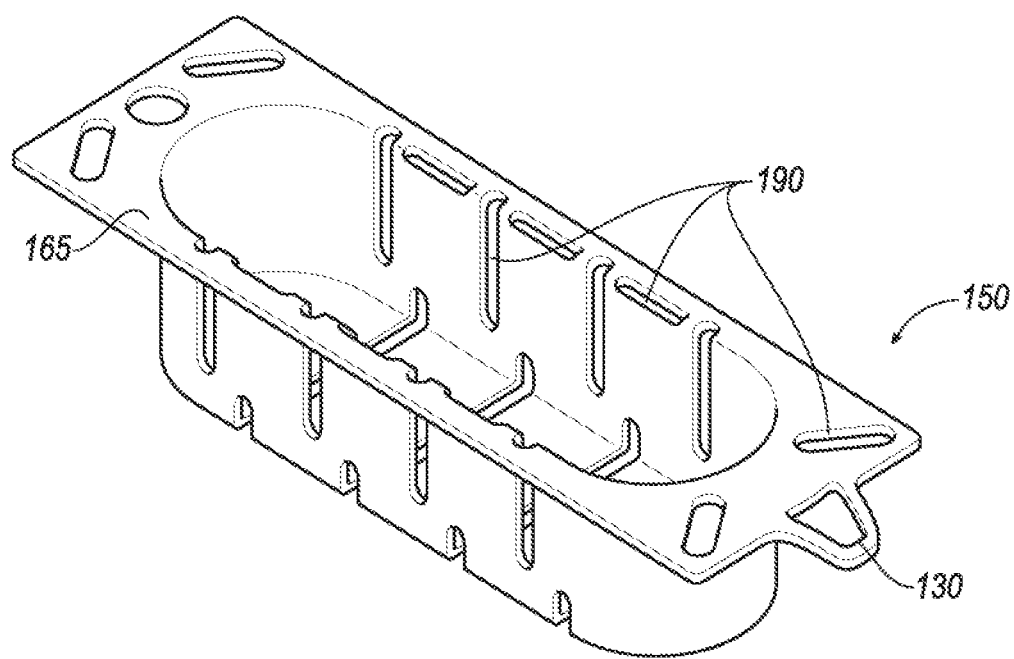
FIG. 7 illustrates an example receptacle having a plurality of slots.

FIG. 7 illustrates an example receptacle 150 having a plurality of slots 190. The slots 190, similar to the slots 190 of plate 180, may provide for a collapsible bin design. The slots 190 may be arranged on a bottom of the receptacle 150 (not specifically shown), and may extend vertically, horizontally, etc. The lip 165 may define various slots 190, as well as the tab 130.

Figure 8:
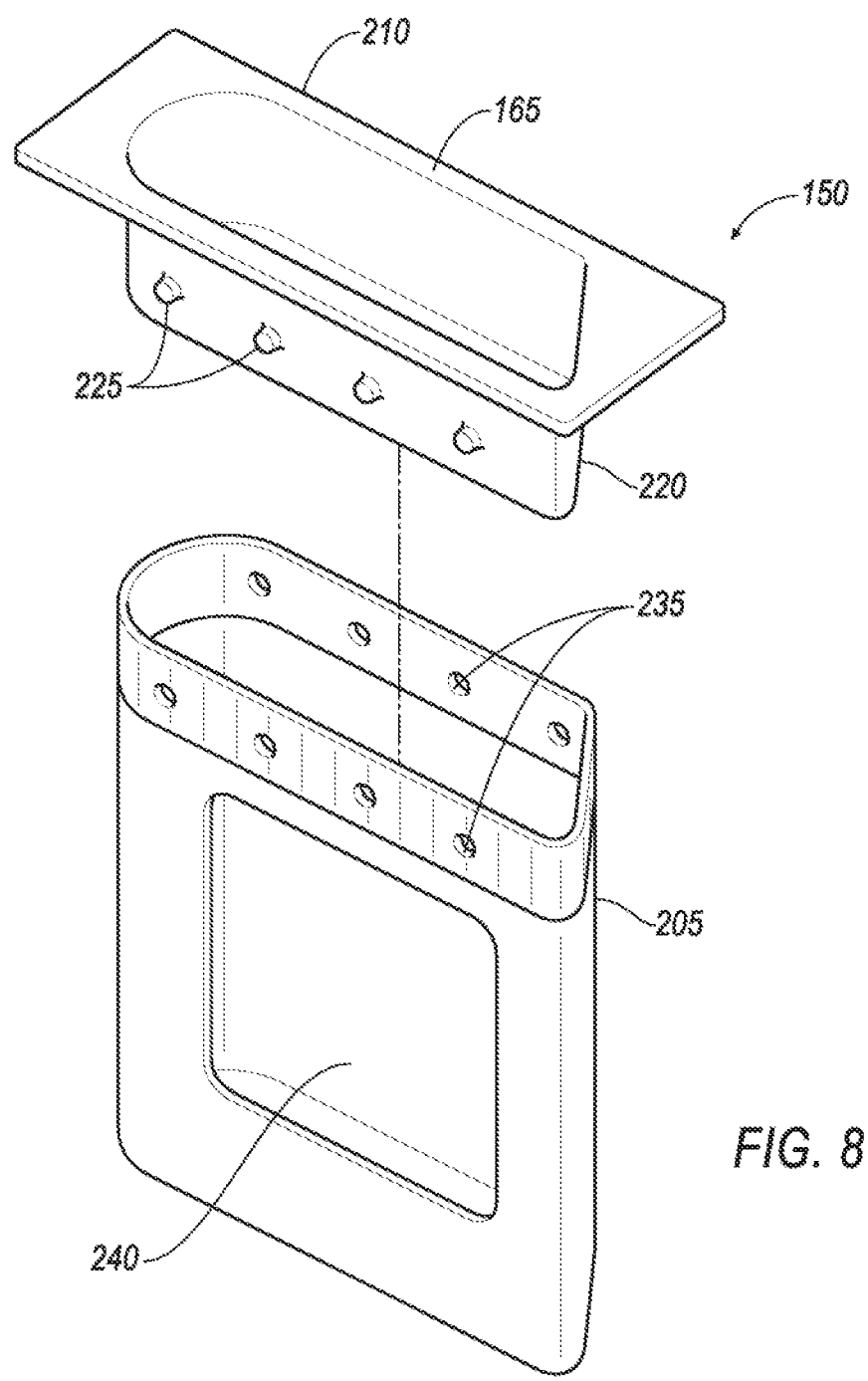
FIG. 8 illustrates an example receptacle having a removable portion.

FIG. 8 illustrates an example receptacle 150 having a removable portion 205. The receptacle 150 may include a first portion 210 including the lip 165 and a collar 220 extending downward therefrom. The collar 220 may include at least one first fastening mechanism 225. The removable portion 205 may from a second portion 205 configured to attach to the first portion 210. The second portion 205 may form a pocket or a bin for receiving items. The second portion 205 may be made of rubber or other thermoplastic elastomer. The pocket may be used to store mobile devices, small articles, or trash. The rubber or elastomer material may allow the second portion 205 to be washable and reusable. The second portion 205 may include a plurality of second or mating fastening mechanisms 235 configured to connect or attach with corresponding first fastening mechanisms 225 of the first portion 210. In one example, the first fastening mechanisms 225 may be protrusions and the second fastening mechanisms may be holes, each configured to receive a respective protrusion. In another example, the first and second fastening mechanisms 225, 235 may be a snap mechanism, a hole and eye mechanism, a latch, Velcro, etc.

The second portion 205 may define a window 240. The receptacle 150 may include various interchangeable second portions 205. The second portions 205 may include a variety of shapes, sizes and materials. Depending on the needs of the driver, one of the various second portions 205 may be selected. The first portion 210 including the lip 165 may slide along the tracks 162 as described above. Once in the deployed position, the driver may detach one of the second portions 205 and replace it with another second portion 205.

Figure 9A:
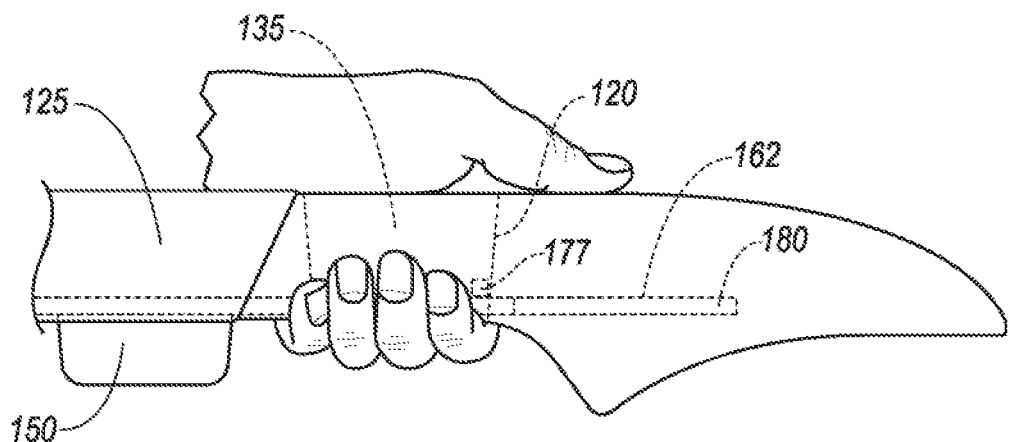
FIG. 9A illustrates an example cross-sectional view of the handle and each of the receptacle and plate in the stored positions.
Figure 9B:
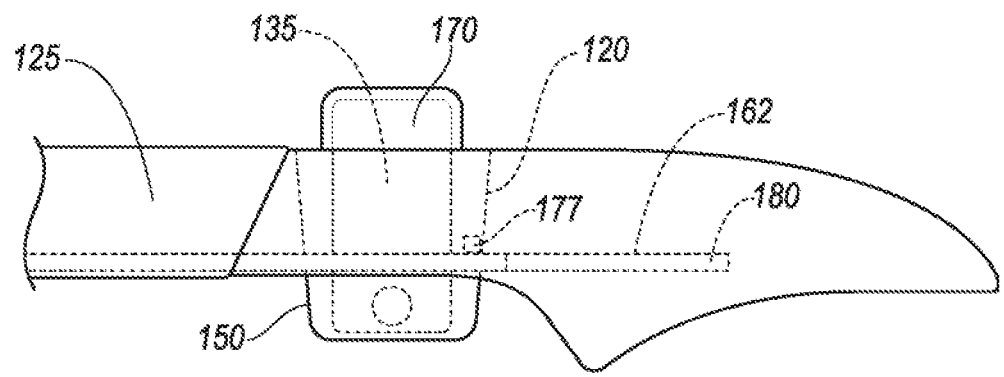
FIG. 9B illustrates an example cross-sectional view of the handle and the receptacle in the deployed position and the plate in the stored position.

FIGS. 9A and 9B illustrate example cross-sectional views of a portion of the door assembly 100 similar to FIGS. 5A and 5B. In this example, both the plate 180 and the receptacle 150 may be implemented in the same door assembly 100 to give the user the option of closing the handle 120 with one of the receptacle 150 or the plate 180. In the example shown, the plate 180 may be stored in a forward position relative to the handle 120 and the receptacle 150 may be stored in a rearward position relative to the handle 120, though the opposite configuration could be implemented.

In FIG. 9A, the receptacle 150 and the plate 180 are in the stored positions, allowing the opening 135 to be completely passable and thus allowing a driver's hand to extend through the opening and around the handle 120. FIG. 9B illustrates an example cross-sectional view of the handle 120 and the receptacle 150 in the deployed position, while the plate 180 remains in the stored position. In the deployed position, the receptacle 150 is arranged under the opening 135, thus closing the opening at the bottom and created a storage vessel or repository. In another example, the receptacle 150 could remain in the stored position and the plate 180 may be pulled from the stored position into the deployed position to close the opening.

Accordingly, a deployable receptacle is disclosed herein whereby the receptacle may be movable along a pair of tracks from a stored position within or under an armrest of vehicle door, to a deployed position under a handle on the vehicle door to create a repository for receiving objects such as mobile devices, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle door assembly, comprising:
   an interior door panel having an armrest, the armrest having a handle defining an opening therein;
   a receptacle arranged below the armrest and configured to be selectively arranged under the handle to create a repository within the opening to receive objects; and
   a track arranged below the armrest and configured to retain the receptacle, wherein the receptacle is slidable along the track between a stored position within the interior door panel and a deployed position under the handle.

2. The assembly of claim 1, wherein the receptacle defines a lip around an upper periphery, the lip configured to engage the track and be slidable therein.

3. The assembly of claim 2, further comprising a push-pin arranged on the track and configured to abut at least a portion of the lip of the receptacle to maintain the receptacle in a fixed location relative to the track when the pin is in a relaxed state.

4. The assembly of claim 2, wherein the receptacle includes a first portion including the lip and a second portion including a bin and being selectively removable from the first portion.

5. The assembly of claim 4, wherein the first portion includes a collar defining a plurality of protrusions and the second portion includes a plurality of holes, each configured to engage with a respective protrusion of the first portion.

6. The assembly of claim 1, wherein the receptacle includes at least one tab accessible to a user to facilitate pushing and pulling of the receptacle between stored and deployed positions.

* * * * *